Patented June 9, 1953

2,641,568

UNITED STATES PATENT OFFICE 2,641,568

PROCESS FOR PREPARING FUNGAL AMYLASE FROM BUTANOL-ACETONE FERMENTATION STILLAGE

Samuel C. Beesch, Philadelphia, Pa., assignor to Publicker Industries Inc., Philadelphia, Pa., a corporation of Pennsylvania No Drawing. Application March 7, 1949, Serial No. 80,102

1 Claim. (Cl. 195—73)

The present invention relates generally to the production of fungal amylase and it relates more particularly to the preparation of fungal amylase by the oxidative fermentation by an Aspergillus of a medium made up of an aqueous mash consisting essentially of the stillage from a butanol fermentation.

An object of the present invention is to provide a new and improved process for preparing fungal amylase. Another object of the present invention is to utilize the stillage from a butanol fermentation (which would otherwise be a waste material) as the substrate for the fermentation of an Aspergillus (particularly *Aspergillus niger*) in connection with the production of fungal amylase.

Other objects and advantages of the present invention are apparent in the following detailed description and appended claim.

Fungal amylase has been found to have considerable importance in that it can be used to replace malt, either partly or totally, in the ethanol fermentation of grain or starchy mashes, with resultant alcohol yields equal to, and in most cases far superior to, those obtained by using malt. Thus, while mold culture filtrates have low Lintner values as compared to malt (since they apparently contain little or no beta-amylase), they nevertheless effectively saccharify starch to produce ultimate yields of fermentable sugars which are as high as, or higher than, those obtained by saccharification with ordinary distiller's malt. Fungal amylase is also useful in the preparation of maltose syrups from grain.

Accordingly, the present invention contemplates a new and improved process for manufacturing fungal amylase in quantities sufficient for its use on a large industrial scale, employing as the fermentation medium a substrate which would otherwise be a waste material, namely the stillage from a butanol-acetone fermentation utilizing *Clostridium acetobutylicum* on a mash which may be either invert molasses, blackstrap molasses or grain.

Among the substrates which have been tried and which have been found to yield satisfactory amounts of alpha-amylase when fermented with *Aspergillus niger* (or other suitable strain of Aspergillus) are the following:

1. Stillage from the butanol-acetone fermentation of invert molasses (employing *Clostridium acetobutylicum*).

2. Stillage from the butanol-acetone fermentation of invert molasses plus the following additives (calculated as parts per liter of mash):

Corn meal (ground) _____percent\_\_ 1
Calcium carbonate_____do\_\_\_\_ 0.5
Zinc sulfate powder_____grams\_\_ 0.002
Aluminum powder_____do\_\_\_\_ 0.014

3. Stillage from the butanol-acetone fermentation of invert molasses plus the following:

Percent
Corn meal (ground) _____ 1
Calcium carbonate_____ 0.5

4. Stillage from the butanol-acetone fermentation of blackstrap molasses.

5. Stillage from the butanol-acetone fermentation of blackstrap molasses plus the following:

Corn meal (ground) _____percent\_\_ 1
Calcium carbonate _____do\_\_\_\_ 0.5
Zinc sulfate powder_____grams\_\_ 0.002
Aluminum powder_____do\_\_\_\_ 0.014

6. Stillage from the butanol-acetone fermentation of blackstrap molasses plus the following:

Percent
Corn meal (ground) _____ 1
Calcium carbonate_____ 0.5

7. Stillage from the butanol-acetone fermentation of grain.

8. Stillage from butanol-acetone fermentation of grain plus the following:

Corn meal (ground) _____percent\_\_ 1
Calcium carbonate_____do\_\_\_\_ 0.5
Zinc sulfate powder _____grams\_\_ 0.002
Aluminum powder_____do\_\_\_\_ 0.014

9. Stillage from the butanol-acetone fermentation of grain plus the following:

Percent
Corn meal (ground) _____ 1
Calcium carbonate_____ 0.5

The following represents a preferred embodiment of the process of the present invention.

The substrate is made up to one liter volume and the pH adjusted, in all cases, to 5.5, employing lime. It is then placed in a 2000 ml. Erlenmeyer flask, sterilized for about 20 minutes at approximately 250° F., cooled, and inoculated with a 5% inoculum of *Aspergillus niger* (or other appropriate strain of Aspergillus) grown for 48 hours on a 4% ethyl grain solubles mash (whose pH is adjusted to 5.5 at the start, employing lime). A number of these flasks are placed on a large shaker rotating at about 175 R. P. M. and incubated at approximately 30° C., for a total of 120 hours; a sterile aseptic sample being removed from each flask every 24 hours and analyzed for amylase content. The results obtained are listed in the table below:

TABLE

*Analytical results in alpha-amylase units*

| Substrate | 24 hours | 48 hours | 72 hours | 96 hours | 120 hours |
|---|---|---|---|---|---|
| 1 | 3.5 | 11.8 | 16.8 | 19.0 | 18.6 |
| 2 | 4.1 | 12.5 | 28.5 | 31.3 | 41.5 |
| 3 | 11.8 | 26.0 | 34.0 | | |
| 4 | 3.6 | 12.5 | 26.0 | 25.0 | 21.7 |
| 5 | 4.6 | 17.5 | 31.3 | 43.4 | 39.3 |
| 6 | 12.5 | 34.0 | 47.5 | | |
| 7 | 4.7 | 6.8 | 7.5 | 10.5 | 16.5 |
| 8 | 9.8 | 30.0 | 32.7 | 39.5 | |
| 9 | 12.5 | 33.0 | 47.5 | | |

Generally comparable results are obtained when the aeration is effected by sparging instead of shaking in air.

From the foregoing it is evident that the present invention provides a practical process for producing fungal amylase (which, as pointed out hereinabove, is a very inexpensive replacement for malt, in addition to improving the yield, in the ethanol fermentation of grain) utilizing the stillage from a butanol-acetone fermentation, a substance which would otherwise be a waste material, presenting a serious disposal problem.

The expression *"Clostridium acetobutylicum"* is used herein in a generic sense as indicating any organism capable of fermenting a molasses or grain mash to give substantial yields of butanol and acetone.

Of the various strains of *Aspergillus niger* which have been tested for fungal amylase production by the oxidative fermentation of butanol-acetone stillage, the strain isolated by Northern Regional Research Laboratories and identified as strain NRRL-337 has been found to be most effective. Another strain found to be effective is NRRL-330.

The present invention may be embodied in other specific forms without departing from the spirit or essential attributes thereof, and it is therefore desired that the present embodiments be considered in all respects as illustrative and not restrictive, reference being had to the appended claim rather than to the foregoing description to indicate the scope of the invention.

Having thus described my invention, I claim as new and desire to protect by Letters Patent:

A process for preparing fungal amylase which comprises forming an aqueous mash comprising essentially the stillage from the fermentation of a member of the group consisting of molasses and grain employing *Clostridium acetobutylicum*, adding about 1% ground corn meal, 0.5% calcium carbonate, 0.002 gram per liter of zinc sulfate powder and 0.014 gram per liter of aluminum powder, adjusting the pH to approximately 5.5, sterilizing the mash by heating at approximately 250° F., cooling, inoculating with approximately 5% inoculum of *Aspergillus niger*, and incubating at about 30° C., for about 48–120 hours while introducing air thereinto.

SAMUEL C. BEESCH.

References Cited in the file of this patent

UNITED STATES PATENTS

| Number | Name | Date |
|---|---|---|
| 2,291,009 | Underkofler | July 28, 1942 |
| 2,447,814 | Novak | Aug. 24, 1948 |
| 2,451,567 | Mense et al. | Oct. 19, 1948 |